United States Patent [19]

Hayes

[11] Patent Number: 4,981,333

[45] Date of Patent: Jan. 1, 1991

[54] UNIVERSAL LAUNCH CABLE ASSEMBLY AND INTEGRATED IDEALIZED LIGHT SOURCE SYSTEM USING SAME

[75] Inventor: James E. Hayes, Winchester, Mass.

[73] Assignee: Fotec, Inc., Boston, Mass.

[21] Appl. No.: 413,264

[22] Filed: Sep. 27, 1989

[51] Int. Cl.$^5$ .............................................. G02B 6/26
[52] U.S. Cl. ................................ 350/96.20; 350/96.15
[58] Field of Search ............... 350/96.20, 96.21, 96.22, 350/96.15

[56] References Cited

U.S. PATENT DOCUMENTS

| | | | |
|---|---|---|---|
| 4,162,821 | 7/1979 | Schumacher | 350/96.21 |
| 4,763,976 | 8/1988 | Nolan et al. | 350/96.20 X |
| 4,877,300 | 10/1989 | Newhouse et al. | 350/96.15 |

Primary Examiner—John D. Lee
Assistant Examiner—Phan T. Heartney
Attorney, Agent, or Firm—Joseph S. Iandiorio

[57] ABSTRACT

A universal launch cable assembly for testing multimode fiber optic cable includes a first connector for interfacing with a light source; a second connector for interfacing with a fiber optic cable to be tested; and a stepped index fiber optic cable having an optical fiber of a diameter larger than the diameter of the fiber in the cable to be tested and being disposed in a curved path and having a numerical aperture for generating a secondary uniform, symmetrical, idealized light source. Also disclosed is an intergrated idealized light source system using the univeral launch cable and having means for adjusting the output of the light source as a function of the diameter of the fiber in the cable to be tested.

7 Claims, 4 Drawing Sheets

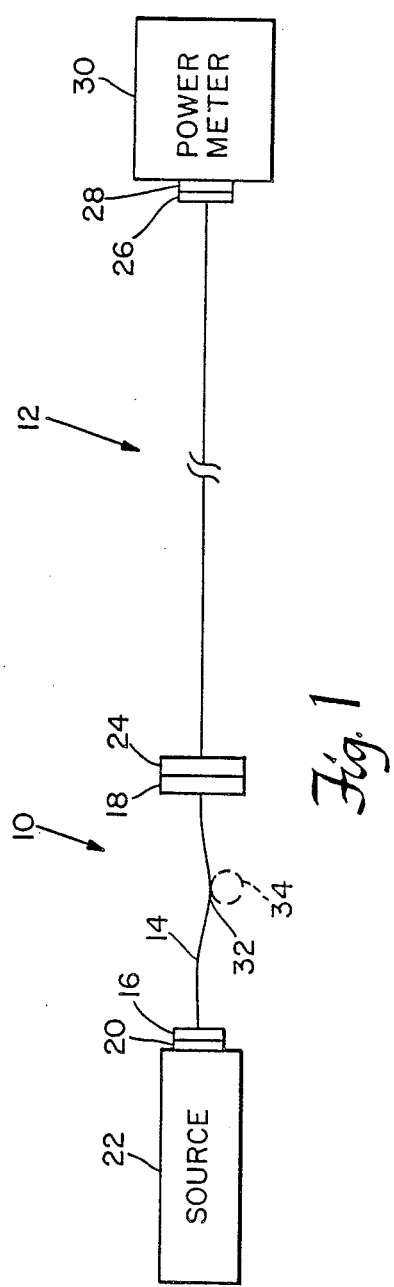
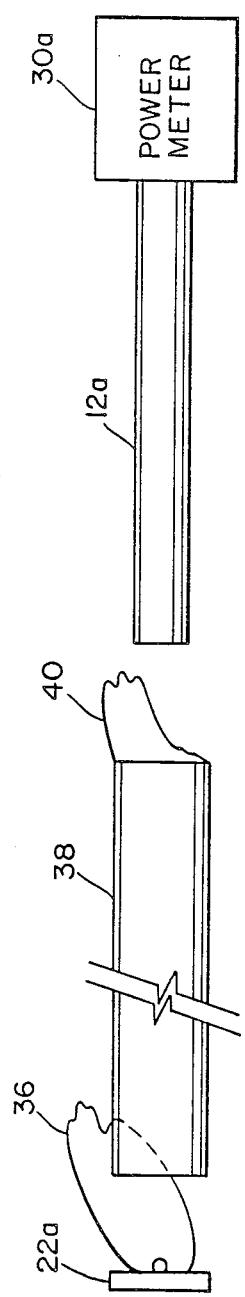

UNIVERSAL LAUNCH CABLE ASSEMBLY AND INTEGRATED IDEALIZED LIGHT SOURCE SYSTEM USING SAME

FIELD OF INVENTION

This invention relates to a universal launch cable assembly for multimode fiber optic cable testing, and to such an assembly which can be utilized in an integrated idealized light source system which is tunable to the particular diameter fiber to be tested.

BACKGROUND OF INVENTION

It is necessary to test fiber optic cable before installation to determine whether the cable is adequate for the application and free from defects. Testing is accomplished by utilizing a matching launch cable between the test light source and the cable to be tested with a power meter connected to the free end of the cable under test. The launch cable has to mate with the light source and has to have a connector which is mated to the one on the cable to be tested. Further, the launch cable has to have the same diameter as the cable under test in order to prevent loss from leakage around the mismatched cable diameters. This means that test equipment would have to include at least one launch cable of each different available size: 50, 62.5, 85 and 100 microns. This makes for expensive and cumbersome test equipment. Even with matched diameter cables there is leakage and consequent inaccuracy because of variation within manufacturing tolerances of approximately 3% in diameter and 6% in area. In addition, in multimode fiber optic cable there is typically uneven distribution of light in the cable because of the non-uniform effect of the cable on the different modes of light. Typically the higher order modes travel longer distances than the lower order modes and so the high order modes are more likely to be attenuated, causing a concentration of lower order light in the cable. This creates an inconsistency in test conditions because the actual light distribution from the launch cable is uncertain. While mode scramblers and mode filters are available, they do require matching diameter cables and they are difficult to accurately calibrate for test applications. Inaccuracies are also introduced in fiber optic test equipment due to mismatch in the numerical apertures between the launch cable and test light source when a graded index launch cable is used. This is so because graded index launch cables transmit the light source output with all of its peculiarities and therefore preserve all of the variations in light sources due to manufacturing variations.

A separate problem occurs because of the field personnel's difficulty in obtaining accurate readings due to a misalignment of the launch cable and the cable to be tested or because of differences in diameter in those cables. The difference in diameters may be due merely to manufacturing tolerances or to the use of mismatched cables. The result is that the loss of light at the launch cable/test cable interface requires an arithmetic accommodation of the power meter reading in order to identify the loss attributable only to the cable under test.

SUMMARY OF INVENTION

It is therefore an object of this invention to provide an improved universal launch cable assembly which can be used for accurately testing a variety of different size cables.

It is a further object of this invention to provide such an improved universal launch cable assembly which produces a symmetrical uniform light output in multimode cables.

It is a further object of this invention to provide such an improved universal launch cable assembly which produces an idealized light source for consistent testing results.

It is a further object of this invention to provide such an improved universal launch cable assembly which does not transmit peculiarities in the light produced by the test source.

It is a further object of this invention to provide such an improved universal launch cable assembly which is relatively insensitive to variations in the diameters of the test and launch cable.

It is a further object of this invention to provide such an improved universal launch cable assembly which is tunable to the diameter of the cable under test to provide a direct reading of output power.

It is a further object of this invention to provide an integrated idealized light source system using the universal launch cable.

This invention results from the realization that a truly effective idealized light source for testing fiber optic cable can be achieved by using a curved, stepped index launch cable with proper numerical aperture to produce, irrespective of irregularities in the light source, an idealized, symmetric, uniform light output to the cable under test which permits the use of a single larger diameter launch cable for testing any number of different diameter cables to be tested.

It is a further realization of this invention that errors introduced by personnel misinterpreting power meter readings can be eliminated by using an integrated idealized light system which may be tuned to "zero" the power meter by compensating the light source output for losses that will be incurred at the cable connectors not due to the cable under test.

This invention features a universal launch cable (ULC) assembly for testing multimode fiber optic cable. There is a first connector for interfacing with a light source and a second connector for interfacing with a fiber optic cable to be tested. A step index optical fiber in the ULC has a diameter larger than the diameter of the optical fiber to be tested and is disposed in a curved path and has a numerical aperture for generating a secondary uniform, symmetrical, idealized light source.

In a preferred embodiment the launch cable has an optical fiber of diameter of more than 50 microns and a numerical aperture of 0.15 to 0.35. The stepped index optical fiber may be a self-stripping fiber and may include a cladding and a buffer surrounding the cladding for stripping the light traveling in the cladding. The second connector may have the end surface of the optical fiber recessed for avoiding surface contact with the end surface of the fiber optic cable to be tested, and the universal launch cable may include at least a single loop to provide the curved path.

The invention also features an integrated idealized light source system for testing fiber optic cable which includes the universal launch cable assembly in a housing with a light source. A power source in the housing energizes the light source and there are means externally accessible in the housing for adjusting the output of the light source as a function of the diameter of the cable to be tested.

DISCLOSURE OF PREFERRED EMBODIMENT

Other objects, features and advantages will occur to those skilled in the art from the following description of a preferred embodiment and the accompanying drawings, in which:

FIG. 1 is a schematic diagram of a universal launch cable assembly according to this invention;

FIG. 2 is an enlarged schematic diagram of a prior art device showing the problems caused by irregular light sources;

Figure 3:
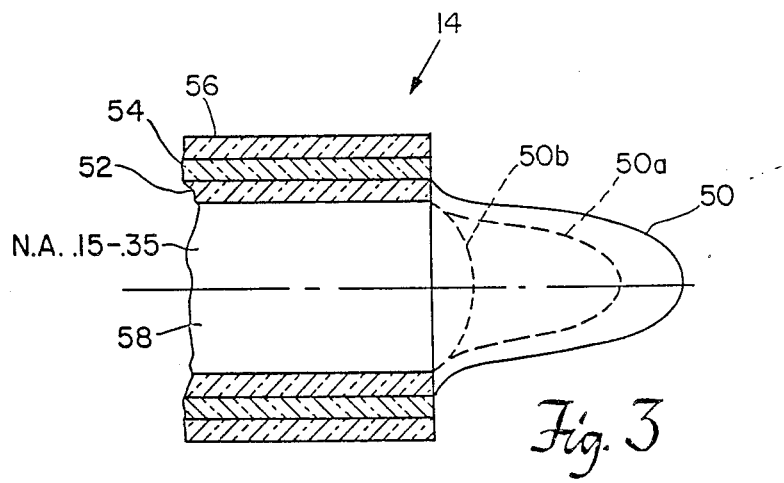
FIG. 3 is an enlarged partial view in section of the end of a stepped index launch cable for providing the secondary idealized light source according to this invention.

There is shown in FIG. 1 a universal launch cable assembly 10 according to this invention for testing a multimode fiber optic cable 12. Universal launch cable assembly 10 includes a stepped index fiber optic cable 14 having a connector 16, 18 on each end. Connector 16 mates with a similar connector 20 on light source 22, while connector 18 mates with a similar connector 24 on one end of the cable 12 under test. The other end of cable 12 includes a connector 26 which mates with a similar connector 28 on power meter 30. In operation, light source 22 is energized to provide light through cable 14 to connector 18. Connector 18 is then connected directly to connector 28 on a power meter, where a reading is made. Then cable 12 to be tested is inserted, as shown in FIG. 1, and a second power meter reading is made. The difference between the two meter readings is the amount of power lost in the connection 18–24 and in cable 12. The power loss is an indication of quality and suitability which is used to determine whether cable 12 is adequate for the proposed purpose.

Typically according to this invention, cable 14 may be approximately 200 microns in diameter, while cable 12 under test may be any size smaller than that. For example, the standard sizes of 50, 62.5, 85 and 100 microns. Generally there is a slight curvature 32 in cable 14. If that curvature is not present or is insufficient for reasons explained hereinafter, a specific loop 34 or number of loops may be introduced into cable 14.

One of the problems in the prior art occurs because the light sources, such as LED 22a, FIG. 2, provide inconsistent regularity in their light output 36. In a conventional graded index launch cable 38, shown without connectors for simplicity, the irregular pattern of radiation 36 from LED 22a is reproduced more or less faithfully at the other end of cable 38, where it appears as a similar light pattern 40. Because of the irregularity and nonsymmetry of light pattern 40 emerging from launch cable 38, any misalignment of the test cable 12a, shown without connectors for simplicity, will dramatically alter the amount of light introduced into it and therefore the reading of power meter 30a. This effect occurs if cable 12a and cable 38 are slightly misaligned or if cable 12a has a different diameter than cable 38, either because it is a different size cable or simply because of the small manufacturing tolerances that practically occur: typical manufacturing variations include approximately 3% in diameter or 6% in area.

Figure 4:
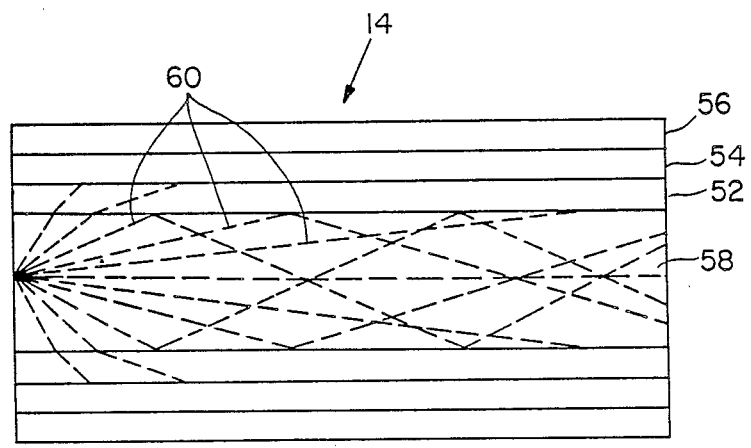
FIG. 4 is a ray diagram showing the behavior of numerous light modes propagating through a step index fiber optic element.
Figure 6:
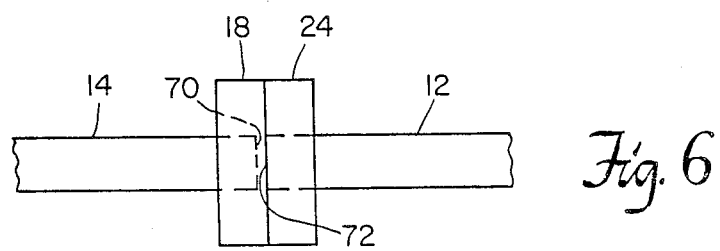
FIG. 6 is a schematic view of an interface of the launch cable and cable under test according to this invention showing the recessed launch cable position.
Figure 5:
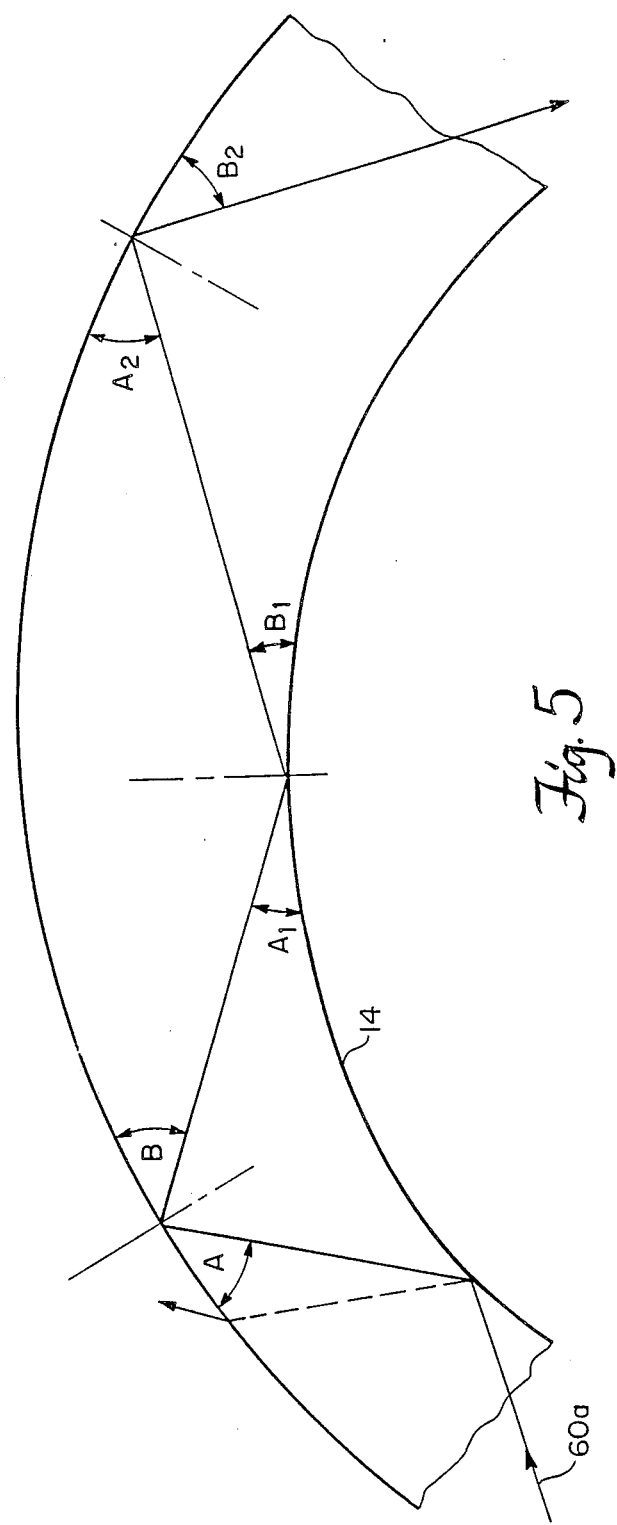
FIG. 5 is a schematic ray diagram showing the scrambling effect of the curvature of a fiber optic element on a ray propagating through it.

To overcome that problem in accordance with this invention, cable 14 is made of a stepped index fiber optic element which provides a scrambling of the various modes of light propagated in order to produce a uniform and symmetrical light output 50, FIG. 3, which functions as a secondary idealized light source for the cable under test. Thus, regardless of the difference in size of the launch fiber and fiber under test, the uniform and symmetrical nature of the secondary idealized light output 50 causes the fiber in the test cable to be uniformly and consistently illuminated. Launch cable 14 also includes cladding 52 and a buffer 14 which strips the leakage light travelling in cladding 52. The scrambling effect of the stepped index cable in conjunction with a core 58 having a suitable numerical aperture such as 0.15 to 0.35, creates the uniform symmetrical idealized secondary light source 50. Variations in the numerical aperture permit a tailoring of the light output 50 such as shown by the light output 50a and 50b shown in phantom. The scrambling of the light in cable 14 is illustrated more clearly in FIG. 4, where the light rays 60 in different modes can be seen to be intermixed as they propagate along cable 14. Even with the scrambling provided by stepped index fiber optic cable 14 as shown in FIG. 4, there is insufficient mode mixing, which may result in spotty and irregular light patterns at the output of launch cable 14. Therefore the launch cable intentionally has a curvature induced in it, such as curvature 32 or 34, FIG. 1. Due to this curvature, each incoming ray, instead of maintaining the same relative angles of incidence throughout their propagation, as shown with respect to ray 60 in FIG. 4, is compelled by the curvature to change its angle of incidence as indicated by ray 60a, FIG. 5, as it moves through curved cable 14. That angles A, B are different from angles $A_1$, $B_1$, which are in turn different from angles $A_2$, $B_2$, can be easily seen in FIG. 5. Because of this there is a complete scrambling of all modes, and a symmetrical uniform light output 50 results. To further enhance the effectiveness of launch cable 14, the face 70, FIG. 6, may be definitively recessed so that it never quite engages face 72 of test cable 12. In this way the face of the launch cable is protected over repeated uses.

Figure 7:
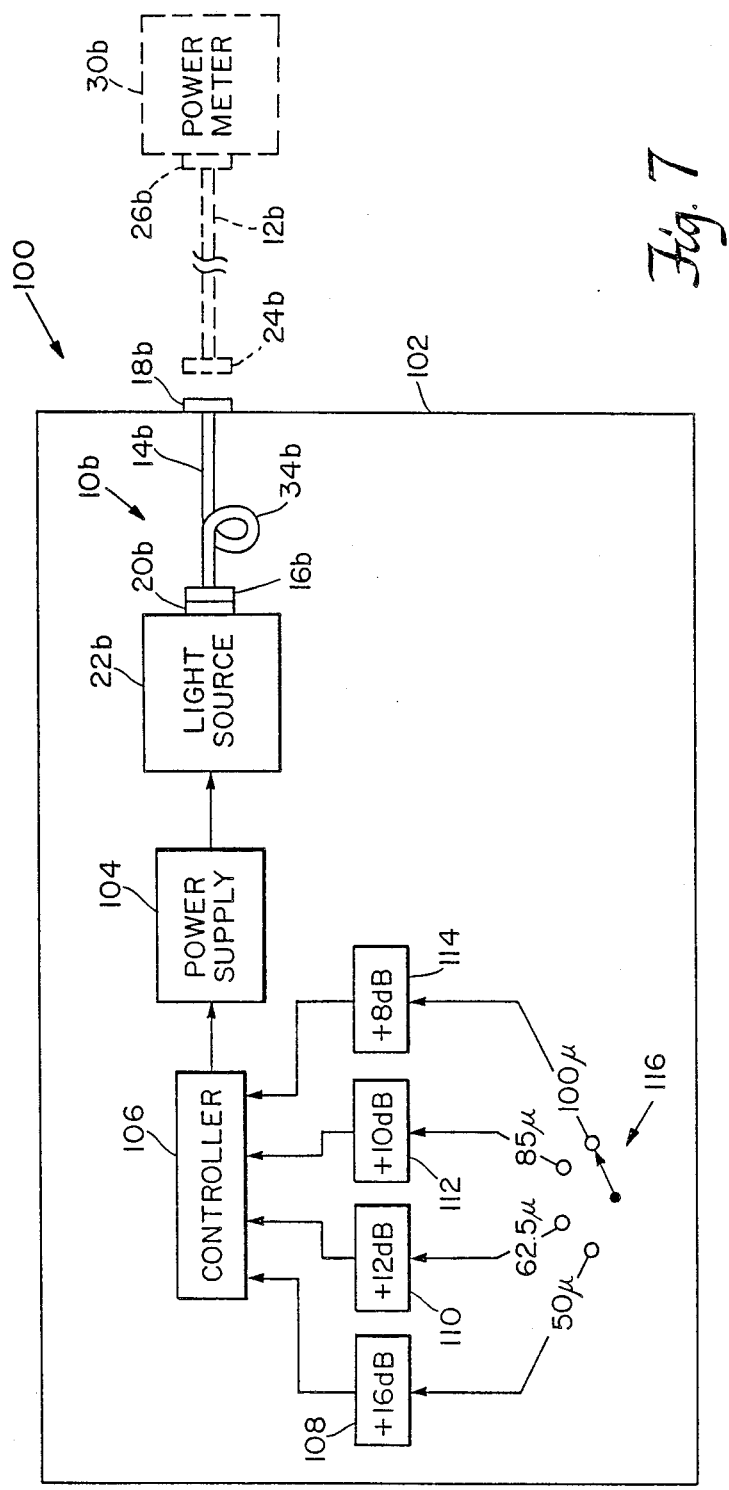
FIG. 7 is a schematic view cf an integrated idealized light source system using the universal launch cable according to this invention.

Since there are losses at the interfaces of the launch cable and cable under test due to differences in diameter, either due to manufacturing tolerances or to the matching of cables of clearly different sizes, an accommodation must be made in reading the power meter. That is, the power drop caused by losses at the interface not directly attributable to the cable under test must be subtracted from the overall power loss detected by power meter 30. Because of this and the need for a proper light source system for testing fiber optic cable, an integrated idealized light source system 100, FIG. 7, is provided in accordance with this invention. A housing 102 includes light source 22b and launch cable assembly 10b. The universal launch cable assembly 10b is also included in housing 102 with its connector 18b mounted in a housing to be accessible from the outside. The power supply 104 drives light source 22b and in turn is operated by controller 106. Controller 106 can be made to increase the power from power supply 104 to light source 22b so that the output of light source 22b is increased by a factor of approximately 16 dB 108, 12 dB 110, 10 dB 112, or 8 dB, 114, in dependence upon whether switch 116 is set at a test cable diameter of 50 microns, 62.5 microns, 80 microns, or 100 microns, respectively. Switch 116 is accessible on the outside of housing 102. The dB factors introduced by the settings of switch 116 are empirically determined to compensate for the losses when cables of that size are interfaced with the oversized, typically 200 micron diameter, cable 14b and the universal launch cable 10b according to this invention. That is, when test cable 12b is 50 microns, the loss at the interface between end connectors 18b and 24b is approximately 16 dB. When test cable 12b has a diameter of 62.5 microns, the loss is 12 dB. At 85 micron diameter the loss is 10 dB, and with a 100 micron test cable the loss is 8 dB. Thus any reading of power meter 30b will inherently be low by that amount even without any losses in the cable 12b under test. To compensate for this and allow power meter 30b to read directly the losses in cable 12b, controller 106 responds to the position of switch 116 to increase the power output of light source 22b by the associated factor. Thus for example, with a 50 micron diameter cable 12b under test, the loss at junction 18b, 24b will be 16 dB's. Therefore controller 106 drives power supply 104 to increase the output of light source 22b by 16 dB, thus exactly offsetting the loss introduced at connectors 18b, 24b, and zeroing power meter 30b so that any deviation from zero of power meter 30b when test cable 12b is in place will automatically indicate losses incurred due to the cable alone and not the loss at the interface.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An integrated idealized light source system for testing fiber optic cable comprising:

a housing;
   a light source in said housing;
   a universal launch cable assembly including a first connector for interfacing with said light source in said housing and a second connector forming an external port in said housing adapted for connection with a fiber optic cable to be tested; and a stepped index fiber optic cable having a diameter larger than the diameter of the cable to be tested and being disposed in a curved path and having a numerical aperture for generating a secondary uniform, symmetrical idealized light source;
   a power source in said housing for energizing said light source; and
   means, externally accessible in said housing, for adjusting the output of said light source as a function of the diameter of the cable to be tested.

2. The integrated idealized light source system of claim 1 in which said means for adjusting includes indicator means for selecting the diameter of the cable to be tested and means responsive to the indicated diameter for correspondingly increasing the power output of said light source.

3. The integrated idealized light source system of claim 1 in which said diameter of the launch cable is more than 50 microns.

4. The integrated idealized light source system of claim 1 in which said numerical aperture is from 0.15 to 0.35.

5. The integrated idealized light source system of claim 1 in which said stepped index fiber optic cable is a self-stripping fiber and includes a cladding and a buffer surrounding the cladding for stripping light traveling in the cladding.

6. The integrated idealized light source system of claim 1 in which said second connector has the end surface of the fiber optic cable recessed for avoiding surface contact with the end surface of the fiber optic cable to be tested.

7. The integrated idealized light source system of claim 1 in which said launch cable contains at least a single loop.

* * * * *